Figure 1:
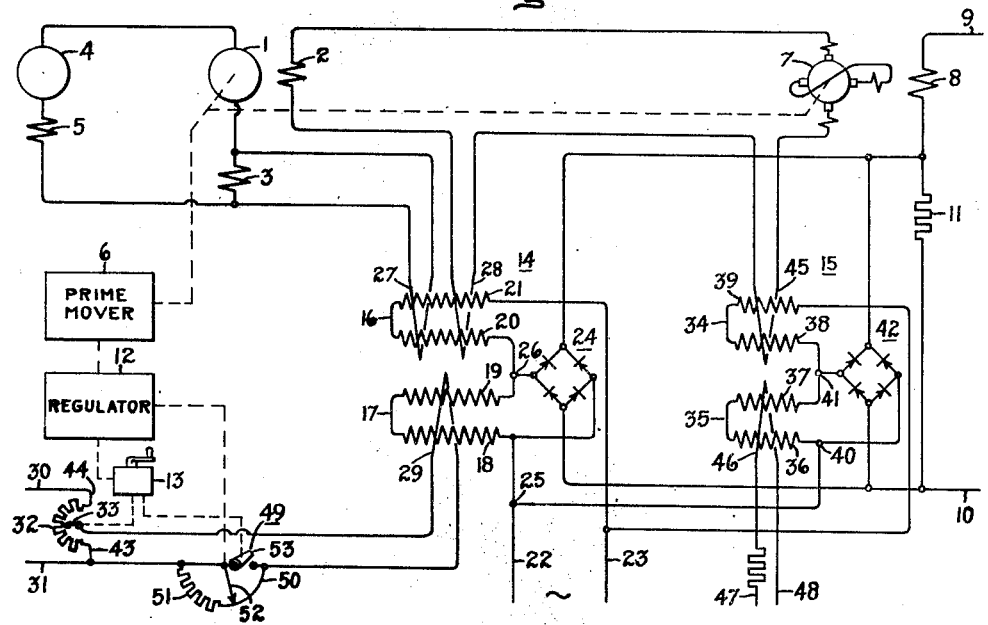

Nov. 3, 1953

C. A. BRANCKE 2,658,152

POWER SYSTEM

Filed June 20, 1952

Inventor:
Carl A. Brancke,
by  *Rowell S. Mack*
His Attorney.

Patented Nov. 3, 1953

2,658,152

UNITED STATES PATENT OFFICE 2,658,152

POWER SYSTEM

Carl A. Brancke, North East, Pa., assignor to General Electric Company, a corporation of New York Application June 20, 1952, Serial No. 294,677

12 Claims. (Cl. 290—3)

This invention relates to electrical power systems and more particularly to the electrical power system for a self-propelled vehicle, such as a gas turbine-electric locomotive.

In the past, the diesel-electric locomotive has commonly been provided with an electrical power system including a traction generator mechanically connected to be driven by the diesel engine and having a separately excited field winding connected to be energized from an exciter machine, also driven by the prime mover. The traction generator is connected to energize the traction motors of the locomotive while the exciter machine is provided with a control field exciting winding. The exciter control field winding is in turn energized by a variable source of voltage such as a magnetic amplifier.

In order to obtain maximum generator utilization with a generator of minimum size in such an electrical power system, it has been the practice to provide a fixed maximum limit on generator field current. This limit is ordinarily provided by connecting a direct current saturating winding of the magnetic amplifier in series with the separately excited field winding of the traction generator. A maximum generator line current limit may also be provided and this may be accomplished by connecting a direct current saturating winding of another magnetic amplifier across the series commutating field winding of the generator, with the output of the second magnetic amplifier being connected in parallel with the output of the first magnetic amplifier. With this arrangement, the magnetic amplifier having the greater output will take over control and thus the magnetic amplifier responsive to the generator field current will take over to regulate the amplidyne control field excitation when the generator field current reaches a predetermined value and the magnetic amplifier responsive to generator line current will take over to regulate the amplidyne control field excitation when the generator line current reaches a predetermined value.

On a diesel-electric locomotive, the power plant regulator normally superimposes a third limit over the generator line current and field current limits in order to match the power output of the generator with the power ability of the engine. The power plant regulator provides a maximum fuel limit to restrict the engine to its maximum torque rating. With the engine then having a limit on its horsepower at any given speed, it is necessary for the governor to also regulate the generator to prevent stalling the engine. This restriction of the generator to keep it within the power ability of the engine also keeps it within its own commutation limits. In order to establish the desired level of generator line current and field current below the respective limits for these currents, the magnetic amplifiers are provided with other direct current saturating windings, the energization of which is varied responsive to the throttle position. Thus, in each throttle position or notch, different generator load current and line current limits are selected by the throttle.

In applying the gas turbine as a prime mover to the locomotive, problems not encountered in utilizing the diesel engine are found. Typical of these problems is the fact that a gas turbine having a turbine driven compressor does not have the fixed limit on its power ability found in the supercharged diesel engine. Gas turbine power plants of this type have their power output varied over a relatively wide range, dependent upon the atmospheric pressure and temperature conditions. Thus, in order to provide a single shaft gas turbine power plant which will produce sufficient power to satisfy the maximum power output of the generator under the most unfavorable conditions of atmospheric pressure and temperature, this power plant under favorable atmospheric conditions will produce power in excess of the commutating ability of the generator. Furthermore, independently of the variation in power output due to atmospheric conditions, in installations where the gas turbine power plant drives a plurality of generators, the power plant will obviously have a potential power ability in excess of that of the remaining generator when one or more generators are shut down, as by electrical difficulty. The control of the power ability of the gas turbine as a prime mover is not completely feasible with a conventional power plant regulator since a limit on fuel flow which will limit the prime mover power to the desired level under favorable atmospheric conditions will again produce an excess of power under favorable conditions, or in any event when one or more generators are shut down. It can thus be readily seen that since an inherent power limit in the prime mover or its regulator is lacking in the case of a gas turbine power plant, some control means is needed to provide a power limit for the electrical power system independent of the prime mover.

Another problem encountered in the gas turbine-electric locomotive not found in the diesel-electric locomotive is the fact that the gas turbine has a much slower response than the diesel, i. e., the gas turbine is much slower to respond to increases in speed called for by the governor. In the basic power system of a diesel-electric locomotive, the line current limit magnetic amplifier is re-calibrated and the diesel speed is changed on each throttle position so that each increase in prime mover speed is accompanied by an increase in the generator line current level. On each throttle advance, the governor immediately increases the fuel and usually overtravels into the load control range, thus also reducing generator output. The diesel speed increases so rapidly, however, that only a momentary reduction in power output is obtained, which is not objectionable. In the gas turbine-electric locomotive, however, by virtue of the slow response of the prime mover, it is necessary for the governor to remain in load control for prolonged periods during each increase in speed. This results in sudden reductions in generator output whenever advancing the throttle handle to call for an increase in output and speed, until the prime mover accelerates to the higher speed called for, together with sudden increases in output, whenever it reaches the new speed setting. Such sudden decreases in generator output with corresponding decreases in locomotive tractive effort, during prime mover accelerations, and the subsequent increases in tractive effort when the prime mover reaches the new speed setting are objectionable. Therefore, it is desirable that the excitation reducing arrangement be tempered or even completely nullified in the lower throttle notches, until the prime mover has accelerated to its rated full load speed.

An object of this invention is therefore to provide an improved electrical power system incorporating the desirable features enumerated above.

Further objects and advantages of this invention will become apparent by reference to the following description and the accompanying drawing, and the features of novelty which characterize this invention will be pointed out with particularity in the claims annexed to and forming a part of this specification.

In accordance with this invention, one or more direct current traction generators are provided having separately excited field windings. The generators are mechanically connected to the prime mover with a speed sensitive governor regulating the fuel rate to the prime mover. Exciter machines, for example, amplidyne generators, are electrically connected to the traction generator exciting field windings and are in turn provided with control exciting field windings. The generators are adapted to be connected to an external load, such as a plurality of traction motors, and each has a series commutating field winding connected in series with its armature and external load. Excitation for each amplidyne control exciting field may be provided by a pair of magnetic amplifiers having rectified outputs connected in parallel across a resistor connected in series with the amplidyne control field. Thus, with a constant source of exciting voltage applied to the control field circuit, the magnetic amplifiers provide a bucking source of voltage across the resistor to thereby regulate the voltage applied to the amplidyne control field. In order suitably to limit the output of the generator, one of the magnetic amplifiers is provided with direct current saturating windings, one of which is energized substantially proportional to the generator line current and the other substantially proportional to the generator line voltage. In actual practice, it has been found preferable to connect one direct current saturating winding across the generator commutating field winding and to connect the other direct current saturating winding in series with the separately excited field winding of the generator. This last winding will therefore be energized responsive to the generator field current which is substantially proportional to generator output voltage. It is seen that the additive combination of the voltages impressed on these two magnetic amplifier saturating windings is a measure of the power output of the generator in the operating range thereof. The magnetic amplifier is so arranged that an increase in the sum of the generator line and field currents, as measured by the direct current saturating windings, results in an increase in the bucking voltage appearing across the resistor in series with the amplidyne control field. This results in a corresponding decrease in the control field excitation to thereby reduce the excitation supplied to the generator, and thus reducing generator output until equilibrium is again reached. The desired generator volt-ampere characteristic is established by a throttle controlled direct current biasing winding on the magnetic amplifier. Thus, as the throttle is advanced calling for higher prime mover speed, the voltage impressed upon the biasing winding of the magnetic amplifier is progressively increased to thereby proportionally reduce the output of the magnetic amplifier responsive to the power limit windings thus reducing the bucking voltage in series with the amplidyne control field and producing a corresponding increase in control field excitation and generator output. It will thus be seen that the maximum power level is established by the biasing winding energized in response to throttle position and that the power responsive windings thereafter maintain the desired generator volt-ampere characteristics. In order to further limit generator field current to the maximum allowable value, an additional magnetic amplifier is provided having its output connected in parallel with the power limit magnetic amplifier. A direct current saturating winding of the additional magnetic amplifier is connected in series with the generator separately excited field winding. A fixed bias may be provided for this field current limit magnetic amplifier. When magnetic amplifiers have their rectified outputs connected in parallel, the magnetic amplifier having the higher output assumes control. The power limit magnetic amplifier will therefore ordinarily control the amplidyne control field, and the field current limit magnetic amplifier will only assume control when the generator field current approaches the predetermined value.

With this system, it is not possible for the generator to produce a combination of terminal voltage and line current which cannot be commutated since the power limit magnetic amplifier will limit excitation to the generator so that this combination of terminal voltage and line current cannot be produced.

In order to provide the load reduction necessary when the prime mover is incapable of developing the power demanded by the generator, the current in the calibrating winding of the power limit magnetic amplifier is reduced by the fuel regulator proportional to the amount the regulator overtravels beyond a maximum fuel position, thus increasing the bucking voltage in the exciter control field circuit to reduce excitation and hence loading as necessary to maintain speed. This load reducing arrangement is nullified in the lower throttle positions until the prime mover reaches rated speed. In practice, a potentiometer may be provided, which is energized from a constant source of voltage, with a movable tap connected to the calibrating winding of the power limit magnetic amplifier and mechanically connected to be operated by the throttle. Thus, with the prime mover idling, the potentiometer tap will be positioned with minimum voltage impressed upon the calibrating winding so that maximum bucking voltage is applied to the exciter control field and minimum excitation is supplied by the exciter. As the throttle is advanced, the movable tap of the potentiometer is progressively moved to increase the voltage applied to the power limit magnetic amplifier calibrating winding thereby to decrease the bucking voltage on the exciter control field winding and increase the excitation supplied by the exciter. The load reduction device may be a rheostat connected between the throttle operated tap on the potentiometer and the power limit magnetic amplifier calibrating winding. This rheostat has its movable element mechanically connected to the regulator and arranged to insert resistance in series with the calibrating winding of the power limit magnetic amplifier proportional to the regulator overtravel beyond the maximum fuel position.

Decreasing the voltage applied to the power limit magnetic amplifier calibrating winding produces an accompanying increase in the bucking voltage in series with the exciter control field circuit, thus reducing the excitation. The rheostat has a blind portion over which the movable element travels for all regulator movements up to the maximum fuel position so that no change in excitation is produced by the load control rheostat until the maximum fuel rate is called for by the regulator. However, when an increase in the prime mover speed is called for by the throttle, the governor calls for full fuel rate and overtravels into the load control range in order to bring the prime mover up to the called-for speed and reduces the current in the power limit magnetic amplifier calibrating winding thereby reducing the excitation applied to the traction generator. In order that this load reduction may not take place during prime mover accelerations, a switch may be provided arranged to render the load control rheostat ineffective until the throttle handle is advanced beyond the position where full speed is first called for.

Figure 2:
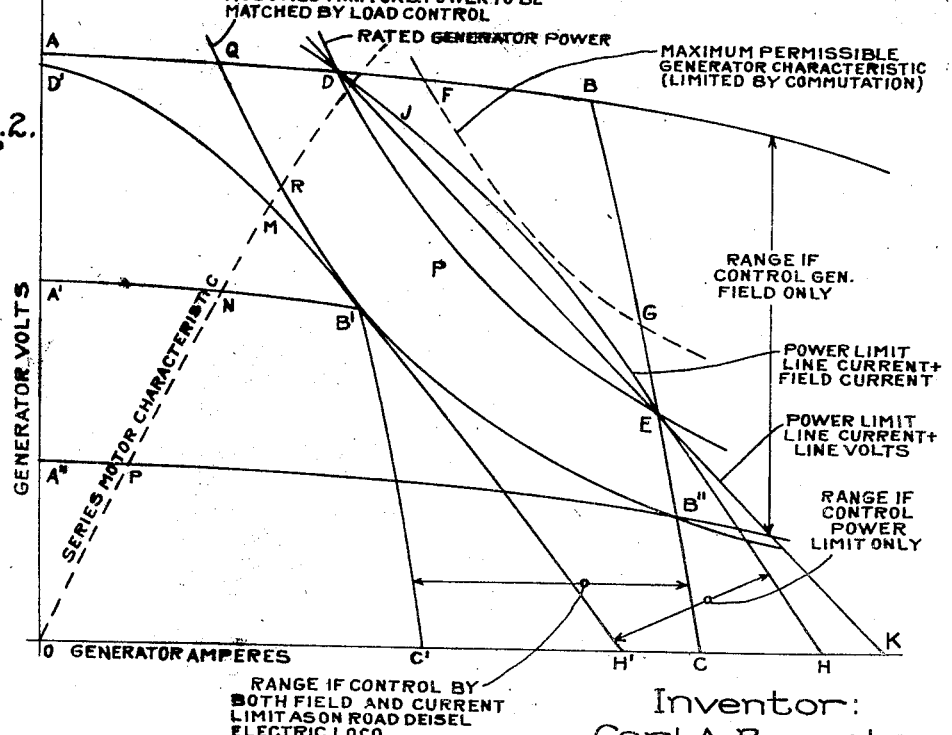

In the drawing, Fig. 1 is a schematic illustration of the improved electrical power system of this invention; and Fig. 2 is a graphical presentation of the electrical quantities involved.

Referring now to Fig. 2 in which generator output voltage is plotted against generator line current, it will be noted that the curve AB is a typical full field characteristic of a separately excited direct current generator, the type conventionally used in self-propelled vehicles such as diesel-electric and gas turbine-electric locomotives. There is, of course, a maximum safe limit of generator field current, and this limit can be obtained by providing a fixed maximum limit on the field current of the generator. Thus, with field currents below the maximum limit, characteristic curves having a configuration of curve AB but at a lower voltage level would be provided. However, a maximum value of field current is provided which will furnish the curve AB. It is also common practice in diesel-electric locomotives to provide for an approximately constant maximum generator line current limit which is shown by the curve BC in Fig. 2. Thus, the power system is ordinarily provided with electrical means to limit the excitation so that current in excess of values along the line BC cannot be obtained. Curve DPE shows the rated power output of a typical generator. It is thus seen that the optimum size of generator which can satisfactorily commutate all the combinations of terminal voltages and line currents defined by the line DPE, with the limiting combination of voltage and current values falling along the line FG cannot satisfactorily commutate the higher combinations of terminal voltages and line currents within the area bounded by the lines FB, BG and GF.

As pointed out above, there is no inherent power limit in the gas turbine prime mover, its regulator, or in the generator excitation control system which will prevent the turbine, under suitable atmospheric conditions, from producing sufficient power to obtain generator power outputs which will exceed values falling along the line FG. Also, when the power plant is driving several generators, if one or more of these generators is shut down, the turbine power ability will be divided among the smaller number of remaining generators so that, independent of atmospheric conditions, the output of each generator would exceed the value of line FG. It is therefore necessary to limit the maximum traction generator output to a value it can commutate, which is along line FG. This limit can be obtained by electrically limiting the maximum traction generator output by regulating the generator with control means which will hold constant either a constant times the generator voltage plus a constant times the generator current, or a constant times the generator field current plus a constant times the generator line current, i. e. figures substantially proportional to the generator power output. Referring again to Fig. 2, an ideal control characteristic would follow curve FG so as to limit the power output to the maximum permissible power output of the generator. No practical means of producing such a curve of precisely this shape has been found, however, and it has been found satisfactory to use some other control characteristic below the maximum power limit FG so long as the corner points D and E of the rated generator power are not cut off. By limiting the generator power output responsive to the additive effect of line current and line voltage, a characteristic DEK is provided. It is apparent that this will permit the generator to supply the rated power at points D and E and power in excess of rated power in the middle area but still below the maximum power along the line FG. By controlling the generator output responsive to the additive effect of generator line current and generator field current, the curve DJEH is produced. Here again, the rated power at points D and E is provided and the power provided in the middle area of the curve is still below the maximum generator power and slightly above that permitted by the alternative method of control. It has been found that the latter type of limit is preferable since it restricts the generator line current sufficiently at zero volts, i. e., point H, so that the conventional line current limit BEC could be discarded. Furthermore, generator field current is more accessible in the control panels thereby simplifying the control system. This generator volt-ampere characteristic provides optimum utilization of available power without increasing the size of the generator beyond that required for rated output of the prime mover. A material increase in locomotive power defined by area DJEPD is thus obtained whenever the prime mover is capable of developing more than rated power or one or more generators are disconnected.

Referring now to Fig. 1, there is schematically shown an electrical power system providing the characteristics discussed in connection with Fig. 2. Here, a direct current traction generator 1 is provided having an exciting field winding 2 and a series commuting field winding 2 and a series commutating field winding 3. The generator is shown schematically as having its armature connected to a series traction motor 4 having a series winding 5, it being readily understood that a plurality of such motors would ordinarily be provided with suitable switching arrangements to provide series or parallel operation. These arrangements, however, do not form a part of this invention and will not be further described. The armature of the generator 1 is mechanically connected to be driven by a suitable prime mover 6, such as a gas turbine. The separately excited field winding 2 of the traction generator 1 is electrically connected to a suitable exciter machine 7, shown as being of the armature reaction type commonly referred to as an amplidyne. The exciter 7 is in turn provided with a suitable control field winding 8 arranged to be energized from a suitable source of constant voltage direct current (not shown) by lines 9 and 10, and having a resistor 11 arranged in series therewith, as will be hereinafter more fully described. It will be readily understood that the gas turbine power plant 6 may drive several additional generators and exciters.

In order to maintain constant speed for each throttle position or notch, the prime mover 6 is controlled by a suitable regulator or governor 12 which may be of the type shown in Patent 2,558,592 issued June 26, 1951, to Neil E. Starkey, Carl B. Lewis and Martin A. Edwards, and assigned to the assignee of the present application. This governor does not form a part of this invention and will not be further described. The governor 12 is in turn electrically connected to a manually operated throttle or controller 13 which controls the setting of the governor which automatically provides the desired fuel rate and thus the desired prime mover speeds.

In order to regulate the control field winding 8 of the exciter machine 7 to in turn provide the necessary excitation to the traction generator separately excited field winding 2, an excitation system utilizing low gain magnetic amplifiers is provided to provide continuously modulated control voltages, while maintaining electrical isolation between the control and power circuits. This system regulates generator output as a function of the sum of ampere turns proportional to line current plus ampere turns proportional to generator field current. The required control sensitivity is obtained by arranging the regulating circuits as shown in Fig. 1 with the comparatively low resistance amplidyne exciter control field 8 being connected in a circuit which compares the modulated control voltage appearing across resistor 11 with the constant reference voltage applied at lines 9 and 10. Approximately 1 volt on the amplidyne control field 8 will provide maximum steady state excitation and therefore, assuming reference voltage of approximately 20 volts across lines 9 and 10, a change of only 5 percent in the control voltage will produce 100 percent change in the amplidyne exciter control field current. A base or forcing excitation for the amplidyne exciter 7 is supplied by the constant voltage source of direct current across lines 9 and 10 and the system comes into regulation as soon as the magnetic amplifiers 14 and 15 raise the modulated control voltage appearing across resistor 11 to about 19 volts.

Referring now to magnetic amplifier 14, this arrangement includes a pair of reactors 16 and 17 (not shown) which may be of the 3-legged saturable core type. Serially connected alternating current windings 18, 19, 20 and 21 are arranged on the reactors 16 and 17 and are connected across a suitable source of alternating current, such as a 400 cycle supply by lines 22 and 23. The output of the magnetic amplifier 14 is taken across reactor 17 by connecting a full-wave bridge rectifier 24 across the connection of the winding 18 with line 22, as at 25, and the connection of the winding 19 with the winding 20 as at 26. The output of the full-wave rectifier 24 is in turn connected across the resistor 11 arranged in series with the control field winding 8 of the amplidyne exciter 7.

The magnetic amplifier 14 is controlled by direct current saturating windings 27 and 28 arranged on the reactor 16 with the winding 27 being connected across the commutating field winding 3 of generator 1 and the winding 28 being connected in series between the separately excited field winding 2 of generator 1 and the amplidyne exciter 7. Another direct current saturating winding 29 is arranged on reactor 17 and is arranged for excitation from a suitable source of constant voltage direct current (not shown) by lines 30 and 31. In order to adjust the current in the calibrating winding 29, a suitable potentiometer 32 is connected across lines 30 and 31 with its movable tap 33 connected to one side of the calibrating winding 29 and line 31 being connected to the other side of the winding 29. The movable tap 33 is operably connected to throttle 13 as will be hereinafter more fully described. Load control rheostat 51 is connected in series in this circuit, as will be hereinafter more fully described.

In order to provide a fixed maximum field current limit, the other magnetic amplifier 15 having reactors 34 and 35 (not shown) is provided. Here, alternating current windings 36, 37, 38 and 39 are arranged on the reactors 34 and 35 as shown and serially connected across lines 22 and 23. The output of the magnetic amplifier 15 is taken across the point of connection of the winding 36 with the line 22, as at 40, and the point of connection between the winding 37 and the winding 38, as at 41. Here, again, the output across terminals 40 and 41 is rectified by bridge rectifier 42 which is in turn connected in parallel across the rectifier 24 and the resistor 11. It will be readily understood that the amplifier having the higher output voltage will assume control and will inherently shut off the output of the other amplifier.

In order to provide the power limit feature, the direct current saturating windings 27 and 28 and reactor 16 of magnetic amplifier 14 are connected so that their ampere turns add and it will therefore be readily apparent that the power limit magnetic amplifier 14 will regulate on the sum of the ampere turns proportional to the field current of generator 1 plus the ampere turns proportional to the line current of generator 1, with the direct current calibrating winding 29 on the power limit magnetic amplifier 14 being adjusted by the position of the throttle 13 so as to produce reduced power settings for controlled acceleration of the locomotive. This arrangement produces regulated generator volt-ampere characteristic ADJEH with calibrating winding 29 adjusted for maximum output, together with a suitable number of similar curves at lower current and voltage levels with lower adjustments of calibrating winding 29. In operation, assuming that a source of alternating current is supplied across lines 22 and 23, alternating current windings 18, 19, 20 and 21 will be energized thus respectively producing alternating flux in the reactors 16 and 17. Assuming that current is flowing in the direct current saturating windings 27, 28 and 29, the reactance of reactors 16 and 17 are equal and the voltage appearing across the rectifier 24 equals the voltage appearing across the point 26 and line 23. It will be readily apparent that current flow in either of the direct current saturating windings 27 and 28 will cause unidirectional saturating flux to flow in the reactor 16 thus decreasing the reactance thereof and producing a corresponding reduction in the alternating current voltage appearing across the terminal 26 and line 23. It also will be seen that current flowing in the winding 29 of reactor 17 will also produce unidirectional saturating flux in the reactor 17, thus decreasing the reactance of this reactor and decreasing the alternating current voltage appearing across points 25 and 26. It will now be seen that with a predetermined current flow in the direct current calibrating winding 29 thus producing a reference value of reactance in reactor 17, an increase in the current flowing in direct current windings 27 and 28 will produce a corresponding decrease in the voltage across terminal 26 and line 23, thus increasing the voltage applied to the rectifier 24 across terminals 26 and 25 while a decrease in the current flowing in windings 27 and 28 will produce a corresponding increase in the voltage across terminal 26 and line 23 with an accompanying decrease in the voltage across rectifier 24.

Assuming, therefore, that the throttle 13 is in a position calling for a desired generator volt-ampere characteristic and a desired prime mover speed and that the prime mover is at that speed, a stable condition will be found with the rectifier 24 of magnetic amplifier 14 producing a certain bucking voltage output across the resistor 11, this voltage bucking the constant voltage appearing across lines 9 and 10 so that a resultant voltage appears across the exciter control field 8. This in turn produces the necessary excitation on the traction generator separately excited winding 2 to provide the desired generator current and voltage required for any given load resistance. Assuming, now, that for some reason the generator load resistance increases slightly, thus requiring a slightly higher voltage at a slightly lower current; this incremental increase in load resistance will, with any given value of generator excitation, result in a slight reduction in generator line current, with a corresponding reduction in the voltage appearing across commutating field winding 3. This will in turn reduce the current flowing in saturating winding 27 of reactor 16 thus reducing the unidirectional flux in the reactor to produce a corresponding increase in the reactance and an increase in the voltage appearing across point 26 and line 23. This increase in voltage across point 26 and line 23 will be accompanied by a corresponding decrease in the voltage across points 25 and 26 with a decrease in the voltage applied to the rectifier 24 and a decrease in the output of the magnetic amplifier 14 across resistor 11. There will thus be a decrease in the bucking voltage appearing across resistor 11 and a corresponding increase in the voltage across the amplidyne exciter control field winding 8. This increase in excitation of the exciter 7 will produce a corresponding increase in the excitation applied to the traction generator through the winding 2, thus producing an increase in generator output voltage and load current until equilibrium is again obtained and the system stabilizes at slightly lower current and slightly higher voltage on the original generator volt-ampere characteristic curve. It is now seen that a slight reduction in the load current of generator 1 will produce a corresponding increase in the excitation applied to the generator in order to increase terminal voltage. It will be apparent, however, that this increase in field current of generator 1 flowing in direct current winding 28 of magnetic amplifier 14 produces a corresponding tendency to increase the bucking voltage across resistor 11 to thereby decrease the excitation on the amplidyne control field 8 and the excitation supplied by the amplidyne exciter 7. Thus, a tendency to increase excitation responsive to the decrease in voltage appearing across the winding 27 is accompanied by a tendency to decrease excitation responsive to the increase in voltage appearing in winding 28. It will thus be seen that for any given voltage applied to calibrating winding 29 equilibrium will be reached whenever the sum of the ampere turns produced by windings 27 and 28 reach the proper value. Thus equilibrium will be reached at gradually reducing generator line currents as the generator voltage and field current increases. The exact shapes of the generator volt-ampere characteristic curves depend upon the value of ampere turns proportional to line current in winding 27 as compared to the number of ampere turns proportional to field current in winding 28.

Conversely, it will be seen that a decrease in generator load resistance will result in an increase in generator line current which will produce an increase in the voltage drop across the commutating field winding 3 and a corresponding increase in the current in the direct current saturating winding 27 of reactor 16. This increase in saturating current increases the saturating unidirectional flux in reactor 16 and thus produces a corresponding decrease in the reactance of reactor 16 with an accompanying decrease in the voltage drop across line 23 and terminal 26 which in turn produces a corresponding increase in the voltage appearing across points 25 and 26 and rectifier 24. A corresponding increase in the voltage across the resistor 11 is thus produced decreasing the voltage applied to amplidyne exciter control field 8 and thus the excitation applied to the separately excited generator field 2. This decrease in generator excitation, of course, tends to decrease the terminal voltage and load current until equilibrium is again obtained and the system stabilizes at slightly higher current and slightly lower voltage on the original generator volt-ampere characteristic curve. It should be noted again that decrease in current in the generator field 2 and in the direct current saturating winding 28, tends to increase the voltage across point 26 and line 23 to thereby decrease the voltage applied to the rectifier 24 and the bucking voltage across resistor 11. Thus, there is a corresponding tendency to increase the excitation applied to amplidyne exciter control field 8 and the excitation supplied by the amplidyne exciter 7. Here, again, a state of equilibrium will be reached whenever the sum of the ampere turns produced by windings 27 and 28 reach the proper value. It will now be seen that with a reference current in calibrating winding 29, the output of generator 1 will be regulated to follow the corresponding volt-ampere characteristic and thus limit the current and power to definite limits.

It will be readily apparent that a selective change in reference current in direct current calibrating winding 29 of magnetic amplifier 14 will determine the combinations of line current and field current to be maintained by the windings 27 and 28. Thus, with the throttle in the first notch or position, the movable tap 33 of potentiometer 32 will be at the end 43 of potentiometer, thus permitting minimum current in the winding 29 producing the maximum voltage applied on the rectifier 24, and the maximum bucking voltage across resistor 11. This will result in minimum voltage applied to amplidyne exciter control field 8 with minimum generator line and field currents maintained by windings 27 and 28. As the throttle 13 is advanced to set the governor to call for increased prime mover speeds, the movable tap 33 of potentiometer 32 is also advanced toward the end 44, thus increasing the current in calibrating winding 29 and decreasing the voltage applied to rectifier 24 and the bucking output voltage across resistor 11. This, of course, increases the excitation applied to the amplidyne exciter control field 8 and increases the level of generator output maintained by windings 27 and 28. In the full throttle notch with movable tap 33 of potentiometer 32 at its end 44 and with maximum current in calibrating winding 29, the power limit windings 27 and 28 will maintain generator power along the line DJEH of Fig. 2. This volt-ampere characteristic will be maintained regardless of the excess power which may be available in the gas turbine 6 by virtue of favorable atmospheric pressure and temperature conditions, or removal of one or more generators. The regulator 12 will maintain constant prime mover speed by suitably limiting the fuel to match the variations in power output.

Referring again to Fig. 2, it will be apparent that excessive generator field currents could be provided, even with the power limit magnetic amplifier 14, in the area to the left of point D. Thus, while generator field current is regulated in proper proportion to line current between points D and H, some further limit in the maximum generator field current is necessary to the left of point D. Field current limit magnetic amplifier 15 provides this additional limit with its direct current saturating winding 45 serially connected between generator separately excited field winding 2 and exciter 7. Since it is not necessary to vary the maximum permissible field current, a fixed bias can be applied to this amplifier and thus direct current calibrating winding 46 is provided with a constant direct current voltage from a source (not shown) applied across lines 47 and 48. It will be apparent that for all generator load resistance values that result in operation to the right of point D, the output of rectifier 24 of magnetic amplifier 14 will be higher than the output of rectifier 42 of current limit magnetic amplifier 15, and, therefore, magnetic amplifier 14 will control to maintain the power level determined by throttle 13. It will be readily understood that a series traction motor may be considered as a variable resistance load, with minimum resistance at standstill and gradually increasing resistance as its speed increases. Thus, the traction motor load connected to the generator is continually increasing its resistance as the locomotive speed increases. Thus, in the event the locomotive speed increases to the point where the equivalent motor resistance results in operation to the left of point D, the voltage appearing across direct current winding 45 will produce a sufficiently large voltage across terminals 40 and 41 and thus across rectifier 42 to take over control of the system and thus limit the excitation on amplidyne exciter control field 8 to a satisfactory level.

To summarize, assuming that the locomotive is being started from rest with the prime mover at minimum operating speed, the generator 1 is connected to the traction motor 4 when the throttle is advanced to the first operating position and the movable tap 33 of the potentiometer 32 is positioned by the throttle 13 adjacent the end 43 of the potentiometer 32. There will therefore be no current flowing in the direct current calibrating winding 29 of reactor 17 and the maximum voltage will therefore appear across points 25 and 26 and therefore across resistor 11. It will be readily seen, however, that as the throttle 13 is advanced to call for higher prime mover speeds, it also moves the movable tap 33 of potentiometer 36 toward the end 44, thus permitting progressively greater current flow in the direct current calibrating winding 29. This in turn progressively increases the saturation of reactor 17 and reduces the voltage appearing across points 25 and 26 to produce a corresponding reduction in the bucking voltage appearing across resistor 11. Thus, the level of the bucking voltage appearing across resistor 11 and the level of excitation provided to the amplidyne exciter 7 and the generator field winding 2 is established by the direct current calibrating winding 29 on reactor 17. It will now be readily apparent that for each level of excitation provided by the direct current saturating winding 29, adjustment of excitation supplied to the generator field winding 2 above and below that level to provide the desired level of generator power is provided responsive to the field and line current outputs of generator 1 as measured by the direct current saturating windings 27 and 28. Thus, the output of the generator 1 is normally maintained at the level selected by the throttle operated potentiometer 32 with a maximum permissible power limit being that shown by the line DJEH in Fig. 2 and with an additional maximum generator field current limit being provided by magnetic amplifier 15.

It will now be readily apparent that the system thus far described provides an electrical power system, particularly applicable to a gas turbine-powered locomotive wherein an electrical limit on generator output is provided independent of the power plant ability. This system is also applicable to any locomotive regardless of the type of prime mover employed having more than one traction generator driven by the prime mover where one or more of the generators may be electrically disconnected leaving an excess of prime mover power available for driving the remaining generators. It will be readily apparent that while Fig. 1 shows a power limit system wherein the excitation control is responsive to generator line current and generator field current, the system is also operable responsive to generator line current and generator line voltage. In such an arrangement, the direct current saturating winding 28 would be connected across the armature of generator 1 rather than in series with the generator of field winding 2. It will also be readily seen that while magnetic amplifiers are shown for providing the excitation for the exciter control field, other arrangements responsive to generator line current and field current may be utilized.

The power limit system described above is the invention of Marvin J. Kolhoff and is described in his application Serial No. 291,926, filed June 5, 1952, assigned to the assignee of the present application. As indicated above, it is further desirable to provide an arrangement in which the power plant regulator, in addition to controlling fuel, can also reduce the loading of the generator independent of the limits called for by the throttle, in order to reduce the generator output under those conditions where the power plant power ability is less than the maximum permitted by the generator. It will thus be seen that the basic requirement for load control is that the system be able to reduce the generator output at least to the specified minimum turbine power ability since it is essential that no condition of generator loading will stall the power plant.

Referring, again, to Fig. 2, it is seen that the load control should reduce the maximum generator characteristic defined by the line DJEH to some limit such as that shown by the line QB'B'' in order to prevent stalling the power plant under the most unfavorable conditions. In the present diesel-electric locomotives, the load reduction for load control is obtained by essentially lowering both the field current limit shown by the line AB in Fig. 2 and the line current limit shown by the line BC. This is shown in Fig. 2 by reduction in the limits from ABC down to A'B'C'. The range of load reduction required is determined by point B' which must be low enough to come on or below the minimum turbine power curve shown by the line QB'B''. It will further be seen that in order to get substantially below the turbine minimum power curve QB'B'' by operating directly on the generator field current, the range of load reduction required would then be from line AB down to line A''B'', the width of this range being determined by point B''. It will be seen that in this scheme, any required reduction in load would produce a tremendous reduction in generator output if defined between line AB and line A''B'' where this reduction would only be required at point B''. A smaller yet still substantial reduction is provided when the control is both by field current and line current limit since here the reduction is between the line ABC and the line A'B'C' with that reduction in power being only necessary at point B'. In accordance with this invention, however, this load reduction for load control is obtained by reducing only the power limit as shown by the curve DJEH. By reducing this limit to a lower value, for example, that shown by the curve D'B'H', it will be seen that the power output of the generator is at all times below the minimum turbine power curve QB'B'' and this reduction is limited by point B'. For all other values of current and voltage, this is by far the smallest reduction of all three schemes and requires minimum range.

As pointed out above, referring to Fig. 1, the gas turbine 6 has an inherently slow response as compared with the diesel and therefore, it will be seen that when the throttle 13 is advanced thus resetting the governor 12 to call for an increased speed, the governor 12 may move to the position calling for maximum fuel rate to the turbine 6 in order to bring the turbine up to the desired speed. In the meantime, the controller 13 is also moving the movable tap 33 of potentiometer 32 toward the end 44 to call for increased output from the generator 1. Prior to the time that the turbine 6 has come up to its new speed level the governor 12 may overtravel into full load control also to reduce the electrical loading to bring the turbine up to the desired speed. The load control rheostat 49 having a blind portion 50 and a resistance portion 51, is connected in series with the calibrating winding 29 of magnetic amplifier 14 with its movable element 52 being mechanically connected to the governor 12. The movable element 52 of load control rheostat 49 is therefore operated in synchronism with the fuel controlling mechanism of the governor 12. For all fuel rates up to the maximum, the movable element 52 of the load control rheostat 49 is positioned in the blind zone 50. However, if the turbine is not up to the new speed when the governor reaches the maximum fuel position, the movable element 52 moves into the resistance portion 51. It will thus be seen that with the speed of the prime mover stable and with the prime mover able to develop more power than required by the generator, the movable element 52 will be in the blind zone 50 of load control rheostat 49, thus having no effect upon the energization of the calibrating winding 29 of magnetic amplifier 14. However, when the throttle 13 is advanced thus calling for an increase in speed and in the event the governor 12 moves into full load control, the movable element 52 of the load control rheostat 49 will move all the way into the resistance zone 51, thus inserting all of its resistance in series with the calibrating winding 29 of magnetic amplifier 14 to reduce the current flowing therein and thus to increase the bucking voltage across resistor 11 to decrease the excitation to the traction generator 1. It is thus seen that this decrease in current flow in the calibrating winding 29 reduces the power demand on the generator 1 and thus making more of the net turbine power available for turbine acceleration. It will be readily seen that the resistance inserted in series with the calibrating winding 29 is proportional to governor movement beyond the point where it reaches maximum fuel setting, and reduction in power plant loading is proportional to the amount of resistance inserted into the calibrating winding 29 circuit. Thus, under steady state conditions, the governor first provides maximum fuel rate, and if the turbine is then incapable of producing enough power to maintain rated speed, the governor overtravels into the load control range and regulates the electrical loading within the range provided to maintain speed.

The load control rheostat 49 described above may be connected to reduce the power limit simultaneously on a plurality of generators by inserting resistance in the power limit magnetic amplifier calibrating winding of the magnetic amplifier associated with the excitation system of each generator. Thus, one common load control rheostat connected in the circuit of all of the corresponding reactor windings, which are similarly controlled by a single throttle operated potentiometer, will produce this effect. This arrangement also produces a desirable tapered effect to the load control action. Since no voltage is applied across the power limit magnetic amplifier calibrating winding 29 on the first notch or position of throttle 13, no effect is provided by the load control rheostat 49 and load control is completely nullified on the first notch, whereas the maximum effect is provided in the final notch or position of throttle 13 in which maximum voltage is impressed upon the calibrating winding 29 and where the maximum effect is required. This tapering load control effect, therefore, prevents too great a reduction in locomotive tractive effort in the lower notches, thus improving the locomotive performance particularly during train starting.

It will also be seen that it may not be desirable to permit any sudden reductions in tractive effort which are obtained when the governor 12 moves into full load control in response to a demand for increased turbine speed, or any of the subsequent sudden increases in tractive effort when the governor 12 reduces the fuel rate as the turbine comes up to speed. It may therefore be desirable to render the operation of load control rheostat 49 ineffective during the lower notches or positions of the throttle 13, where less than rated speed is used, and a switch 52 is therefore connected across the load control rheostat 49 and is operated by the throttle 13. This switch is closed in these lower notches of the throttle 13 thus shorting out the load control rheostat 49 to render it ineffective. At a predetermined position of the throttle 13, the switch 52 is opened so that the load control rheostat 49 may thereafter be effective in subsequent throttle positions.

It will now be readily apparent that the above described load control arrangement has inherently less excess load control range. To illustrate, assume that the generator 1 is powering the series traction motor 4 which is running at a speed such that its characteristic is shown by the dashed line OPNMR of Fig. 2. This is one of the conditions where all three of the load reduction schemes described above provide the most excessive load control range. The excess load control reduction by reducing the power limit, as described above, is only from R to M. For the system utilized in diesel-electric locomotives operating on both line current and field current, the excess range is from R to N, and for the scheme which would operate on generator field current only, the excess range would be from R to P. This illustrates graphically that the excess range of load control in accordance with this invention is small compared to the other two arrangements.

It will now be readily apparent that this invention provides an improved electrical power system, particularly suited for applications in connection with gas turbine electric locomotives wherein the power demand is automatically reduced responsive to the power plant speed regulator, with a further arrangement being provided to render this load control feature ineffective during throttle positions below full power plant speed, i. e., during the starting positions. It will also be readily apparent that this improved system is not limited to locomotive use and may be utilized in any stationary system where the power plant has high inertia and the speed must be frequently varied.

While I have shown and described a particular embodiment of this invention, further modifications and improvements will occur to those skilled in the art. I desire it to be understood, therefore, that this invention is not limited to the form shown and I intend, in the appended claims, to cover all modifications which do not depart from the spirit and scope of this invention.

What I claim as new and desire to secure by Letters Patent of the United States is:

1. A power system comprising a generator adapted to be electrically connected to a load, a thermal prime mover mechanically connected to drive said generator, a governor connected to regulate the speed of said prime mover by varying the fuel flow thereto, a throttle connected to vary the setting of said governor and having a plurality of positions, means connected to regulate said generator to maintain the output thereof at a predetermined value, supervisory control means connected further to regulate said generator selectively to establish said output value, and load control means operable in response to said governor connected further to regulate said generator thereby to vary said generator output, said load control means being ineffective below a predetermined fuel rate established by said governor.

2. A power system comprising a generator adapted to be electrically connected to a load and having a separately excited field exciting winding, a thermal prime mover mechanically connected to drive said generator, a governor connected to regulate the speed of said prime mover by varying the fuel flow thereto and being arranged to overtravel past the maximum fuel rate, throttle means connected to vary the setting of said governor and having a plurality of positions, a source of voltage connected to energize said separately excited field winding, means connected to vary said voltage substantially proportional to the output of said generator thereby to maintain said output at a predetermined value, supervisory control means connected further to vary said voltage selectively to establish said output value, and load control means connected still further to vary said voltage responsive to said overtravel of said governor thereby to reduce said generator output, said load control means being ineffective below a predetermined fuel rate established by said governor.

3. A power system comprising a generator adapted to be electrically connected to a load and having a separately excited field exciting winding, a thermal prime mover mechanically connected to drive said generator, a governor connected to regulate the speed of said prime mover by varying the fuel flow thereto and being arranged to overtravel past the maximum fuel rate, throttle means connected to vary the setting of said governor and having a plurality of positions, a source of voltage connected to energize said separately excited field winding, a magnetic amplifier connected to vary said voltage substantially proportional to the output of said generator to maintain said output at a predetermined value, said magnetic amplifier being connected further to vary said voltage responsive to supervisory control means selectively to establish said output value, and load control means connected to vary the output of said magnetic amplifier responsive to said overtravel of said governor thereby to reduce said generator output, said load control means being ineffective below a predetermined fuel rate established by said governor.

4. A power system comprising a generator adapted to be electrically connected to a load and having a separately excited field exciting winding, a thermal prime mover mechanically connected to drive said generator, a governor connected to regulate the speed of said prime mover by varying the fuel flow thereto and being arranged to over-travel past the maximum fuel rate, throttle means connected to vary the setting of said governor and having a plurality of positions, a source of voltage connected to energize said separately excited field winding, a magnetic amplifier connected to vary said voltage substantially proportional to the output of said generator to maintain said output at a predetermined value, said magnetic amplifier being connected further to vary said voltage responsive to supervisory control means selectively to establish said output value, and load control means connected to said governor and operable thereby arranged to vary the output of said magnetic amplifier in response to said over-travel of said governor thereby to reduce said generator output, said load control means being ineffective below a predetermined fuel rate established by said governor.

5. A power system comprising a generator adapted to be electrically connected to a load and having a separately excited field exciting winding, a thermal prime mover mechanically connected to drive said generator, a governor connected to regulate the speed of said prime mover by varying the fuel flow thereto and being arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, means connected to vary said voltage substantially proportional to the output of said generator thereby to maintain said output of said generator at a predetermined value, supervisory control means connected further to vary said voltage selectively to establish said output value, and load control means connected still further to vary said voltage in response to said overtravel of said governor thereby to reduce said generator output rate, said load control means being ineffective below a predetermined fuel rate established by said governor.

6. A power system comprising a generator adapted to be electrically connected to a load and having a separately excited field exciting winding, a thermal prime mover mechanically connected to drive said generator, a governor connected to regulate the speed of said prime mover by varying the fuel flow thereto and arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, a magnetic amplifier connected to vary said voltage substantially proportional to the output of said generator thereby to maintain said output at a predetermined value, said magnetic amplifier being connected further to vary said voltage responsive to supervisory control means selectively to establish said power output value, and load control means connected to said governor and operable thereby arranged to vary the output of said magnetic amplifier in response to said overtravel of said governor thereby to reduce said generator output, said load control means being ineffective below a predetermined fuel rate established by said governor.

7. A power system comprising a generator adapted to be electrically connected to a load and having a separately excited field exciting winding, a thermal prime mover mechanically connected to drive said generator, a governor connected to regulate the speed of said prime mover by varying the fuel flow thereto and being arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, a magnetic amplifier connected to vary said voltage thereby to vary the excitation supplied to said control field winding, said magnetic amplifier having a pair of direct current windings connected for energization substantially in proportion to output of said generator whereby said output is maintained at a predetermined value, said magnetic amplifier having another direct current winding, a constant voltage source of direct current connected to energize said other direct current winding, means connected to said throttle means and operable thereby arranged to vary said constant voltage thereby selectively to establish said output value, and load control means connected to said governor and operable thereby arranged further to vary said constant voltage source in response to said overtravel of said governor thereby to reduce said generator power output, said load control means being ineffective below a predetermined fuel rate established by said governor.

8. A power system comprising a generator adapted to be electrically connected to a load and having a separately excited field exciting winding, a thermal prime mover mechanically connected to drive said generator, a governor connected to regulate the speed of said prime mover by varying the fuel flow thereto and arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, a magnetic amplifier connected to vary said voltage thereby to vary the excitation supplied to said control field winding, said magnetic amplifier having direct current windings connected for energization substantially proportional to the output of said generator whereby said output is maintained at a predetermined value, said magnetic amplifier having another direct current winding, a constant voltage source of direct current connected to energize said other direct current winding, a potentiometer connected across said constant voltage source and having a movable element electrically connected to said other direct current winding, said movable element being connected to said throttle means and operable thereby to vary said constant voltage thereby selectively to establish said generator power output value, a rheostat connected in circuit between said potentiometer movable element and said other direct current winding and having a movable element, said element being connected to said governor and operable thereby further to vary said constant voltage in response to said overtravel of said governor thereby to reduce said generator output, said rheostat having a blind portion whereby said constant voltage is not varied below a predetermined fuel rate established by said governor.

9. A power system comprising a generator adapted to be electrically connected to a load, a thermal prime mover connected to drive said generator, a governor connected to regulate the speed of said prime mover by varying the fuel flow thereto and being arranged to over-travel past the maximum fuel rate, throttle means connected to vary the setting of said governor and having a plurality of positions, means connected to regulate said generator to maintain the output thereof at a predetermined value, supervisory control means connected further to regulate said generator selectively to establish said output value, load control means operable responsive to said overtravel of said governor connected further to regulate said generator thereby to vary said generator output, said load control means being ineffective below a predetermined fuel rate established by said governor, and means connected further to render said load control means ineffective in a predetermined number of positions of said throttle means.

10. A power system comprising a generator adapted to be electrically connected to a load and having a separately excited field exciting winding, a governor connected to regulate the speed of said prime mover by varying the fuel flow thereto and being arranged to overtravel past the maximum fuel rate, throttle means connected to vary the setting of said governor and having a plurality of positions, a source of voltage connected to energize said separately excited field winding, means connected to vary said voltage substantially proportional to the output of said generator thereby to maintain said output at a predetermined value, supervisory control means connected further to vary said voltage selectively to establish said output value, load control means connected still further to vary said voltage responsive to said governor overtravel thereby to reduce said generator power output, said load control means being ineffective below a predetermined fuel rate established by said governor, and means connected further to render said load control means ineffective in a predetermined number of positions of said throttle means.

11. A power system comprising a generator adapted to be electrically connected to a load and having a separately excited field exciting winding, a thermal prime mover mechanically connected to drive said generator, a governor connected to regulate the speed of said prime mover by varying the fuel flow thereto and arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, a magnetic amplifier connected to vary said voltage substantially proportional to the output of said generator thereby to maintain said output at a predetermined value, said magnetic amplifier being connected further to vary said voltage responsive to supervisory control means selectively to establish said output value, load control means connected to said governor and operable thereby arranged to vary the output of said magnetic amplifier in response to said overtravel of said governor thereby to reduce said generator output, said load control means being ineffective below a predetermined fuel rate established by said governor, and means connected further to render said load control means ineffective in a predetermined number of positions of said throttle.

12. A power system comprising a generator adapted to be electrically connected to a load and having a separately excited field exciting winding, a thermal prime mover mechanically connected to drive said generator, a governor connected to regulate the speed of said prime mover by varying the fuel flow thereto and arranged to overtravel past the maximum fuel rate, throttle means connected to vary the setting of said governor and having a plurality of positions, an exciter machine electrically connected to furnish excitation to said separately excited field winding and having a control field winding arranged to vary said excitation, a source of voltage connected to energize said control field winding, a magnetic amplifier connected to vary said voltage thereby to vary the excitation supplied to said control field winding, said magnetic amplifier having direct current windings connected for energization substantially proportional to the output of said generator whereby said output is maintained at a predetermined value, said magnetic amplifier having another direct current winding, a constant voltage source of direct current connected to energize said other direct current winding, a potentiometer connected across said constant voltage source and having a movable element electrically connected to said other direct current winding, said movable element being connected to said throttle means and operable thereby to vary said constant voltage thereby selectively to establish said generator power output value, a rheostat connected in circuit between said potentiometer movable element and said other direct current winding and having a movable element, said element being connected to said governor and operable thereby further to vary said constant voltage in response to said over-travel of said governor thereby to reduce said generator output, said rheostat having a blind portion whereby said constant voltage is not varied below a predetermined fuel rate established by said governor, and a switch connected to said throttle means and operable thereby arranged to render said rheostat ineffective in a predetermined number of positions of said throttle means.

CARL A. BRANCKE.

References Cited in the file of this patent

UNITED STATES PATENTS

| Number | Name | Date |
|---|---|---|
| Re. 23,148 | Krabbe | Sept. 20, 1949 |
| 1,216,237 | Lemp | Feb. 13, 1917 |
| 1,821,827 | Brandenstein | Sept. 1, 1931 |
| 2,098,761 | Schlapfer | Nov. 9, 1937 |
| 2,137,068 | Valentine et al. | Nov. 15, 1938 |
| 2,146,779 | Swanson | Feb. 14, 1939 |
| 2,203,544 | Pestarini | June 4, 1940 |
| 2,324,293 | Edwards | July 13, 1943 |
| 2,393,618 | Edwards et al. | Jan. 29, 1946 |
| 2,393,620 | Adams et al. | Jan. 29, 1946 |
| 2,393,621 | Adams | Jan. 29, 1946 |
| 2,393,622 | Adams et al. | Jan. 29, 1946 |
| 2,476,805 | Bradley | July 19, 1948 |
| 2,501,360 | Strong | Mar. 21, 1950 |
| 2,558,592 | Starkey et al. | June 26, 1951 |